Aug. 2, 1966 W. T. CONDON 3,263,450
DAMPING CONNECTOR FOR A POWER TRAIN
Filed Feb. 13, 1964 2 Sheets-Sheet 1
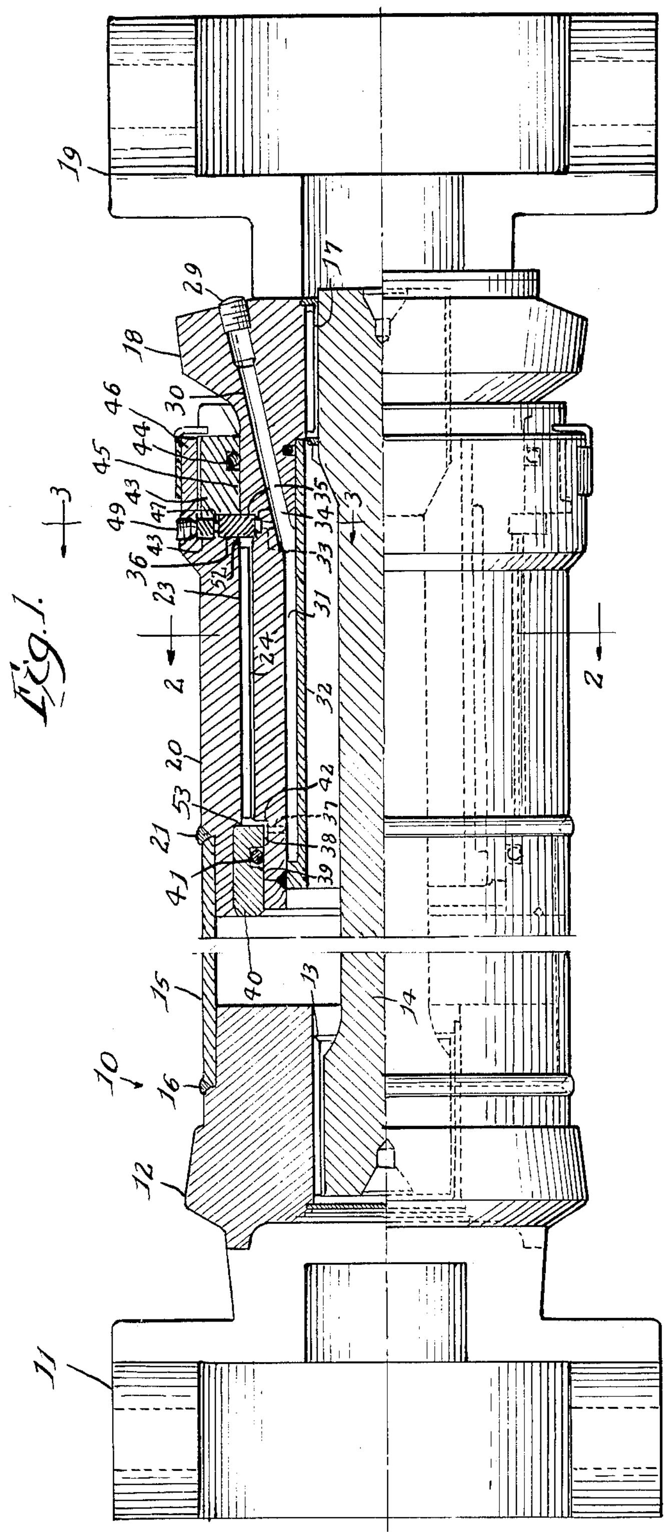
Inventor:
William T. Condon.
By. John W. Darley
Attorney DAMPING CONNECTOR FOR A POWER TRAIN
Filed Feb. 13, 1964 2 Sheets-Sheet 2
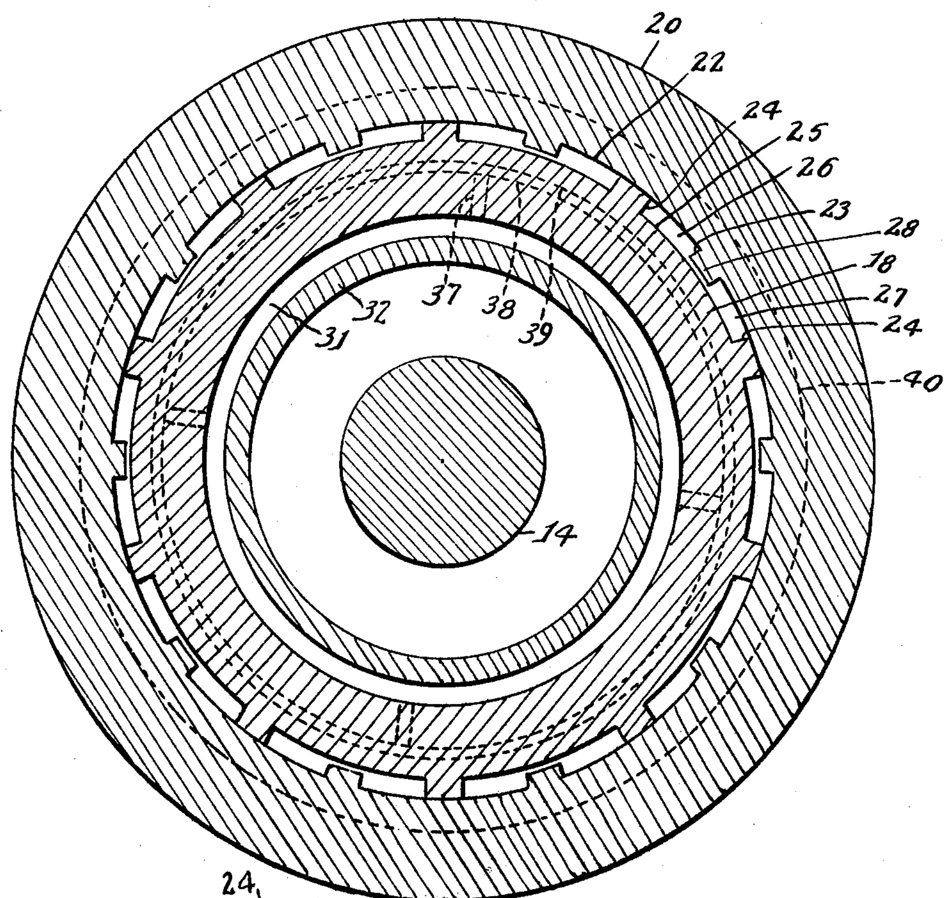
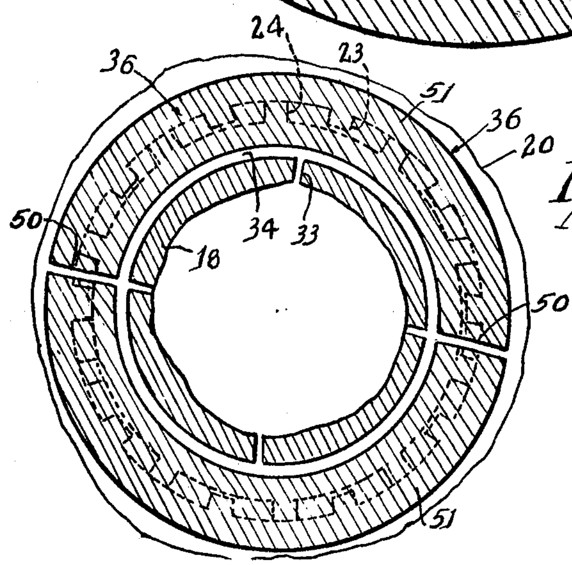
Inventor.
William T. Condon.
By.
John W. Dailey
Attorney.

3,263,450

DAMPING CONNECTOR FOR A POWER TRAIN

William T. Condon, Rockford, Ill., assignor to Twin Disc Clutch Company, Racine, Wis., a corporation of Wisconsin Filed Feb. 13, 1964, Ser. No. 344,615
2 Claims. (Cl. 64—26)

My invention relates to a damping connector forming part of a power train, such as that interposed between an engine and a remotely connected load, and having a length sufficient to be subject to torsional resonance under certain conditions of operation.

By way of example only and not restricted thereto, the invention will be described as applied to a double universal joint connector which is one accepted type of unit for interposing between an engine and a remotely connected load. Such a connector is subject to torsional vibration having a natural frequency, but occasionally, the connector may be subject at certain speeds to periodic forces whose rate is equal to or nearly so the natural vibration rate of the connector. The imposition of these forces may set up a condition of torsional resonance sufficient to establish dynamic instability throughout the torsional system including the engine, shaft or connector and load. These forces derive from the torque impulses of the engine, the inertia of the reciprocating parts of the engine, and the inertia of the load and are particularly critical if torsional resonance occurs within the normal operating range of the system. Failure of some of the power train components occasionally results from this severe condition.

It is therefore one object of the invention to tune a torsional system of the above type by providing a power train connector having a torsion bar characterized by sufficient stiffness so that the system can be subject to torsional resonance only below the idling speed of the engine and hence when the engine is started or stopped.

A further object is to incorporate in the connector a damping provision sufficient to limit to safe values the torsional vibration at resonance during the starting and stopping periods of the engine.

In the drawings:

FIG. 1 is an elevation of the connector, partly in section.

FIG. 2 is an enlarged section along the line 2—2 in FIG. 1.

FIG. 3 is a fragmentary, reduced section along the line 3—3 in FIG. 1.

Referring to FIG. 1, the numeral 10 designates the power train connector overall having at the left or input end a yoke 11 which, it will be understood, is intended to connect universally with a similar yoke attached to the output of a power source, such as an engine (not shown).

The yoke 11 is carried by a ring 12 which surrounds and has a spline connection 13 with the input end of a torsion bar 14. The input end of a tube 15 fits snugly around an external portion of the ring 12, is concentric with and in spaced relation to the torsion bar 14, and is suitably locked to the ring 12 as by welding 16. Accordingly, it will be apparent that the ring 12, torsion bar 14 and tube 15 rotate together without any capacity for relative rotation.

The opposite or output end of the torsion bar 14 extends through and has a spline connection 17 with one end of a concentric sleeve 18 which carries a yoke 19 that is intended to connect universally and conventionally with a similar yoke attached to the input end of a load (not shown). The nature of the spline connection 17 is such that the rear end of the torsion bar 14, the sleeve 18 and yoke 19 rotate together and are not permitted to relatively rotate. So far as described, the power flow through the connector 10 is from the yoke 11 and successively through the ring 12, torsion bar 14, sleeve 18 and yoke 19.

The right or rear end of the tube 15 fits snugly around a forward, peripheral portion of a sleeve 20 and is secured thereto as by welding 21 so that the sleeve 20 and the tube 15 rotate solidly together. The sleeve 20 surrounds an intermediate portion of the sleeve 18, is concentric therewith, and projecting from the interior surface 22 of the sleeve 20 is a plurality of circumferentially spaced, axially positioned spline teeth 23. In cooperating relation with the spline teeth 23 is a plurality of circumferentially spaced, axially positioned spline teeth 24 which project outwardly from the exterior surface 25 of the sleeve 18.

As shown in FIG. 2, the peripheral surfaces of the teeth 24 have bearing relation with the surface 22, this being one of the features of the invention since the utilization of the spline teeth 24 for this purpose obviates the otherwise necessity for separate bearings in this locality. Further, and still referring to FIG. 2, it will be noted that considering any adjacent pair of teeth 24—24 and the tooth 23 which projects between this pair, this relationship creates axially positioned chambers 26 and 27 on opposite sides of the tooth 23, respectively, and included between the surfaces 22 and 25. The chambers 26 and 27 communicate through an orifice passage 28 included between the peripheral surface of the tooth 23 and the surface 25, there being as many orifice passages 28 as there are teeth 23.

Under operating conditions, the chambers 26 and 27 and orifice passages 28 form part of a liquid system which otherwise includes the following features. A plug 29 normally closes the inlet end of an inclined filler passage 30 included in the sleeve 18 and the opposite end of the latter passage connects with one end of an annular reservoir 31 which is coaxial with the sleeve 18 and included therebetween and an annular shell 32 suitably spaced from and attached to the sleeve 18. The length of the reservoir 31 is longer than the splined teeth connection 23–24 so that communication can be provided between the filler passage 30, reservoir 31, and the chambers 26 and 27.

Specifically, a plurality of circumferentially spaced, radial passages 33 in the sleeve 18 connect the filler passage 30 with an annular channel 34 and the latter faces an annular channel 35 in which is seated a split thrust ring 36 to handle thrust loads resulting from length changes. The channel 34 communicates with all of the chambers 26 and 27 at the right end of the spline connection provided by the teeth 23 and 24 in the manner presently described.

At the opposite end of this spline connection, a plurality of circumferentially spaced, radial passages 37 in the sleeve 18, four such being shown in FIG. 2, connect the reservoir 31 with an annular channel 38 which faces a reduced diameter, annular shoulder 39 on which is seated a suitably held ring 40 which serves as a carrier for a seal ring 41 that has sealing contact with the shoulder 39 to the left of the channel 38. The channel 38 communicates with all of the chambers 26 and 27 at the left end of the spline connection provided by the teeth 23 and 24 through an annular clearance passage 42. The ring 40 is additionally retained in position by the encircling left end of the sleeve 20. There may also be four of the radial passages 33. A seal for the liquid system at the right end thereof is provided by a ring 43 which carries a seal ring 44 that has sealing contact with a surface 45 on the sleeve 18 and is suitably held in position between this surface and a surrounding portion 46 of the sleeve 20.

A vent passage 47 extends radially outward from the thrust ring 36 to the periphery of the sleeve 20 and this passage is normally closed by a seal 48 which is retained in position by a plug 49. Considering the liquid system as empty, filling first requires the removal of the plugs 29 and 49 and the seal 48. The liquid is poured into the filler passage 30, flows into the reservoir 31 and outwardly through the radial passages 33 and 37 to the annular channels 34 and 38, respectively.

The liquid moving through the radial passages 33 to the annular channel 34 and thence into gaps 50—50 (see FIG. 3), included between the facing ends of the generally semicircular components 51—51 of the thrust ring 36, flows into all of the chambers 26 and 27 through an annular clearance 52 provided at the adjacent ends of the teeth 23 and 24. The liquid also flows successively through the radial passages 37, annular channel 38, and clearance passage 42 to an annular clearance passage 53 provided at the adjacent ends of the teeth 23 and 24. The clearance passages 52 and 53 are appropriately established by a proper shortening of the teeth 23 and 24. Air originally in the several passages of the system is vented through the then open vent passage 47 and when the system is full of liquid, the seal 48 and the plugs 29 and 49 are positioned as shown in FIG. 1. A suggested liquid is silicone having a kinematic viscosity of 30,000 centistokes at 77° F.

The problem presented by the occurrence of torsional vibration at resonance in a torsional system such as that disclosed, namely, an engine, a remotely connected load, and the connector 10 interposed therebetween, is solved by the connector 10 in the following two step manner. First, the torsion bar 14 possesses sufficient stiffness so that the torsional resonant frequency of the system occurs below the idling speed of the engine and hence torsional resonance happens only when the engine is started and stopped due to inertial characteristics of the engine and the load.

For example, if an engine connected to a remote mounted hydraulic torque converter has an idling speed of 400 r.p.m., a stiffness for the torsion bar 14 connecting these inertias is selected so that the torsional resonant frequency occurs at 300 r.p.m., or at least somewhere below the engine idling speed. Above engine idling speed, the system is free of torsional resonance because of the selected stiffness of the torsion bar 14. The manner of determining the stiffness of the torsion bar 14 for any given condition is well known in the art.

The second step is the provision for adequate damping of the torsional resonance vibration below the engine idling speed and particularly during the starting and stopping phases of the engine. This function is handled by the chambers 26 and 27 and the orifice passages 28. During starting of the engine, for example, the ring 12 and the left ends of the torsion bar 14 and tube 15 (see FIG. 1) rotate together due to their positive connection, but at the opposite end of the connector, the right end of the torsion bar 14 and the load connected sleeve 18, operating as one unit by reason of the standard spline connection 17, may rotate relative to the sleeve 20 that is fast to the right end of the tube 15 and due to the spacing of the teeth 23 and 24. This relative rotation is rapid and causes a liquid flow between the chambers 26 and 27 through the throttling orifices 28. This flow sets up a counter damping torque which limits the vibration at resonance to a safe figure. When stopping the engine, the relative rotation occurs in the opposite direction.

Further, as noted above, the provision of the teeth 24 serving as a bearing between the sleeves 18 and 20 avoids the use of separate bearings between these sleeves and still enables the tube 15 to control the connector couple and bending vibration forces.

I claim:

1. For a power transmitting system including an engine and a remotely connected load, a connector comprising a torsion bar whose input and output ends are respectively connectible to the engine and load, a tube concentric with the torsion bar and having one end tied to the input end of the torsion bar for rotation therewith, and concentric sleeve members respectively carried by the output end of the torsion bar and the opposite end of the tube in a manner enabling relative rotation of said last named ends and including therebetween spaced pairs of liquid filled chambers arranged as an annulus around the torsion bar, each pair of chambers being partially defined by a pair of spaced teeth radially extending from one of the sleeve members and a tooth extending radially in the opposite direction from the other sleeve member between and in spaced relation to the teeth of said pair and having its peripheral face spaced from said one sleeve member to provide an orifice passage connecting said pair of chambers whereby a damping torque is produced during said relative rotation by liquid flow between the chambers of the respective pairs, each said pair of spaced teeth having peripheral bearing contact with said other sleeve member.

2. A structure as defined in claim 1 wherein the chambers form part of a liquid system which includes a reservoir connecting with opposite ends of the chambers to accommodate expansion.

References Cited by the Examiner

UNITED STATES PATENTS

| | | | |
|---|---|---|---|
| 1,965,742 | 7/1934 | Junkers | 64—1 |
| 2,307,187 | 1/1943 | Anderson | 64—26 |
| 2,394,405 | 2/1946 | Schjolin | 64—1 |
| 2,738,660 | 3/1956 | Gail | 64—1 |

FOREIGN PATENTS

| | | |
|---|---|---|
| 743,564 | 1/1956 | Great Britain. |

MILTON KAUFMAN, *Primary Examiner.*

BROUGHTON G. DURHAM, *Examiner.*

H. C. COE, *Assistant Examiner.*